United States Patent [19]

Sakuma

[11] Patent Number: 4,695,132
[45] Date of Patent: * Sep. 22, 1987

[54] Fθ SINGLE LENS

[75] Inventor: Nobuo Sakuma, Tokyo, Japan

[73] Assignee: Ricoh Company, Ltd., Tokyo, Japan

[*] Notice: The portion of the term of this patent subsequent to Feb. 18, 2003 has been disclaimed.

[21] Appl. No.: 394,148

[22] Filed: Jul. 1, 1982

[30] Foreign Application Priority Data

Jul. 2, 1981 [JP] Japan ................. 56-103665

[51] Int. Cl.$^4$ ................................. G02B 3/00
[52] U.S. Cl. ........................... 350/409; 350/410
[58] Field of Search .............. 350/6.8, 409, 410, 475

[56] References Cited

U.S. PATENT DOCUMENTS

| | | | |
|---|---|---|---|
| 1,658,365 | 2/1928 | Altman | 350/475 |
| 2,398,276 | 4/1946 | Altman | 350/410 |
| 4,571,035 | 2/1986 | Sakuma | 350/6.8 |

Primary Examiner—John K. Corbin
Assistant Examiner—Paul M. Dzierzynski
Attorney, Agent, or Firm—Oblon, Fisher, Spivak, McClelland, & Maier

[57] ABSTRACT

An Fθ lens is provided for focusing a laser beam, which is deflected at a constant angular speed, onto a surface being scanned in a manner such that the focused spots moves across the surface being scanned at a constant speed and linearly. The lens is formed by a single meniscus lens having a positive power and having its concave side directed toward an object.

13 Claims, 9 Drawing Figures

Fθ SINGLE LENS

BACKGROUND OF THE INVENTION

The invention relates to an fθ single lens.

Recently, a recording system utilizing a laser beam which is intensity-modulated in accordance with a picture signal corresponding to an image pattern to be recorded in order to scan a record medium optically to achieve a recording of an image, finds practical applications as a printer or a receiving unit of a facsimile system.

The laser beam which is intensity-modulated in accordance with the picture signal is converted into a substantially collimated beam, which then impinges upon deflection means such as a rotating multi-facet mirror so as to be deflected with a substantially constant angular speed. The deflected laser beam is then incident on an fθ, which then focuses it into the recording surface of a photosensitive record medium, thus optically scanning the recording surface in a manner corresponding to the deflection. The fθ lens provides a correction for the deflection of the laser beam which takes place at an equal angular speed so that the focusing spot moves at a constant speed across the recording surface. Specifically, when the laser beam impinges on the entrance pupil of the fθ lens having a focal length of f, with an angle of θ with respect to the optical axis thereof, the beam will be focused onto the recording surface at a point which is displaced by a distance of fθ from the optical axis, the designation "fθ lens" beging derived from such fact.

In the prior art arrangement, an fθ lens comprises a plurality of lenses. However, if the fθ lens is formed by a plurality of lenses, the overall length of the fθ lens increases, and a high accuracy is required in the combination of various element lenses.

It will be appreciated that the beam impinging on the fθ lens has a relatively small diameter and that the beam is deflected only in a given plane. Accordingly, the overall size of the fθ lens can be minimized by forming the lens assembly into strip form. However, where a plurality of lenses are used to form the fθ lens, the accuracy requirement imposed on the combination or individual lenses presents a great difficulty in forming the strip configuration.

To cope with this problem, an attempt has been made to utilize a single lens for the fθ lens. In fact, Japanese Laid-Open Patent Application No. 079,644/1979 and No. 007,727/1980 propose fθ single lenses.

In the arrangement proposed in Japanese Laid-Open Patent Application No. 079,644/1979, an incident laser beam has a deflection plane which forms an angle with the optical axis of the fθ lens because of the manner of use, and hence there results in a difficulty that a curvilinear locus is traced on the recording surface by the focusing spot of the laser beam. In the arrangement of Japanese Laid-Open Patent Application No. 007,727/1980, the lens represents a plano-convex lens, which presents a difficulty in connection with the curvature of the image surface.

SUMMARY OF THE INVENTION

It is an object of the invention to provide an fθ lens capable of scanning a recording surface in a rectilinear form with a constant speed and producing an improved correction for the curvature of the image surface.

The fθ single lens according to the invention represents a meniscus lens having positive power and has its concave surface directed toward an object. Representing the radius of curvature of the first surface or the lens surface which is directed toward the object by $R_1$, the focal length by f and the refractive index by n, these parameters must satisfy the following requirements:

(i) $1.6 \leq n \leq 2.0$
(ii) $-5 \leq R_1/f \leq -1.7$

Such Fθ single lens presents satisfactory fθ characteristic and has an improved correction for the curvature of image surface. The single lens construction minimizes the size, and also facilitates its formation in strip form.

DESCRIPTION OF EMBODIMENTS

Figure 1:
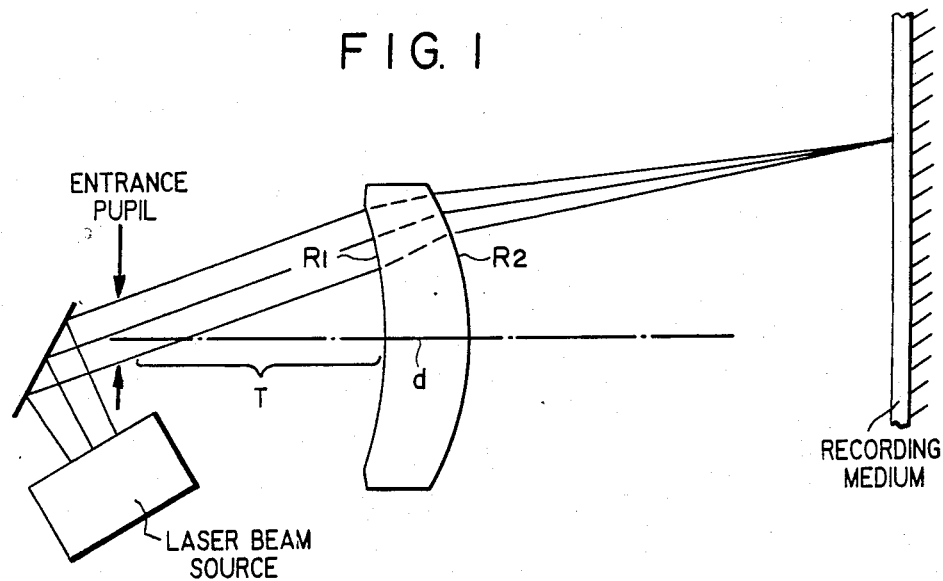
FIG. 1 is a schematic illustration of the configuration of the fθ lens of the invention, showing the end face of the single lens as cut through a plane including the optical axis thereof.

The fθ single lens of the invention represents a single meniscus lens as shown in FIG. 1 having its concave surface directed to an object or to the left, as viewed in FIG. 1. As shown, the radius of curvature of a first surface is represented by $R_1$, the radius of curvature of a second surface by $R_2$ and the separation between the lens surfaces as taken on the optical axis by d.

The fθ lens of the invention must satisfy the following requirements:

(i) $1.6 \leq n \leq 2.0$
(ii) $-5 \leq R_1/f \leq -1.7$ where f represents the focal length and n the refractive index of the lens.

The requirement (i) must be satisfied by the lens material. If the lower limit is exceeded, it becomes difficult to satisfy the requirement of the image surface and fθ characteristic, to be described later, simultaneously. If the upper limit is exceeded, there is little glass material which can be used.

The significance of the requirement (ii) will be described next. The term "fθ characteristic" is known as a quantity which is defined as follows:

$$f\theta \text{ characteristic} = H(\theta) - f\cdot\theta/f\cdot\theta \times 100$$

where θ represents the angle of incidence of a beam onto an fθ lens, and H(θ) a corresponding height of an image. In other words, the fθ chacteristic signifies a deviation from an ideal fθ characteristic, in percentage. For an ideal fθ lens, $H(\theta) = f\cdot\theta$ for every angle of incidence, and the fθ characteristic is equal to zero. Thus, the closer fθ chacteristic of the Fθ lens to zero, the closer the fθ lens to an ideal construction.

Permissible values of fθ characteristic which allow the fθ lens to function in its intended manner depend on the kind and size of originals, the end use of the resulting record image and other factors. This will be more specifically described.

Considering a recording on a record sheet of A4 size, for example, which represents a most general application, it may be assumed that the distance over which the main scanning takes place is equal to 210 mm which is in turn equal to the length of the short side of the A4 size. A displacement in the location of the image formed on the order of ±0.7 mm in the direction of the main scanning produces a distortion in the resulting recorded image which is hardly perceptible. Accordingly, $$\pm 0.7 \div (210/2) \times 100 \approx \pm 0.67\%$$

can be chosen as a measure for the permissible value of the $f\theta$ characteristic.

Therefore, by choosing a suitable location being scanned where the displacement of the image is zero so that the displacement of the image location occurs in the positive and the negative direction therefrom, it is possible to achieve a permissible value for the $f\theta$ characteristic for the entire angle of deflection which is on the order of 1.34%.

Figure 2:
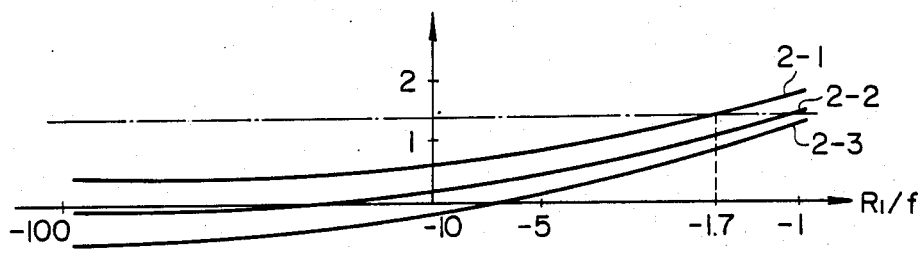
FIG. 2 graphically illustrates several feature of the invention.

FIG. 2 shows the value of $f\theta$ characteristic as a function of $R_1/f$, namely, the ratio of the radius of curvature $R_1$ to the focal length $f$ of a meniscus lens as shown in FIG. 1, with the refractive index $n$ being chosen as a parameter. In FIG. 2, curves 2-1, 2-2 and 2-3 correspond to $n=1.6$, $n=1.8$ and $n=2.0$, respectively. It is presumed that the maximum value of the deflection angle is chosen to be 21°, and the $f\theta$ characteristic shown corresponds to such maximum value.

A horizontal phantom line shown in FIG. 2 represents the perimissible value 1.34% of the $f\theta$ characteristic, which intersects with the curve 2-1 at $R_1/f = -1.7$. Since the magnitude of $f\theta$ characteristic must be less than this value, the $f\theta$ lens which satisfies the requirement (i) must also satisfy the following inequality:

$$R_1/f \leq -1.7$$

This determines the upper limit defined in the requirement (ii).

In order for the $f\theta$ lens to function properly, the image plane must be flat. The flatness of the image plane can be characterized by the curvature of image surface. As is recognized, the curvature of the image surface can be separately considered in sagittal and meridional planes. The permissible values for the curvature of the image surface can be converted into corresponding permissible values for a change in the diameter of the spot. As is well recognized, a laser beam has a cross sectional intensity distribution which is of Gaussian type. When a laser beam is focused with a lens or others, its region of minimum diameter is referred to as "beam waist", the radius of which is usually denoted by $W_0$. The radius of the beam, $W(Z)$, at a distance of $Z$ from the beam waist can be expressed as follows:

$$W(Z) = W_0\sqrt{1 + (\lambda Z/\pi W_0^2)^2}$$

where $\lambda$ represents the wavelength of the laser radiation.

Assuming an increase in the diameter of $\alpha\%$ from the value of $W_0$, the corresponding value of $Z$ can be calculated as follows:

$$\alpha = \{W(Z)/W_0 - 1\} \times 100$$

$$Z = \pm \pi W_0^2 \alpha \sqrt{100(\alpha/100 + 2)}$$

When the line density is equal to 300 dots/inch, the diameter of the spot is normally on the order of 100 micrometer. Hence, when He-Ne laser producing a radiation of $\lambda = 632.8$ nm is used, the permissible value of $\alpha = 10\%$ results in a value of $Z$, which is equal to ±5.7 mm.

For a single lens having a positive power, the curvature of image surface always assumes a negative value, and hence a measure for the curvature of the image surface will be 11.4 mm which corresponds to the described value of $Z$.

Figure 3:
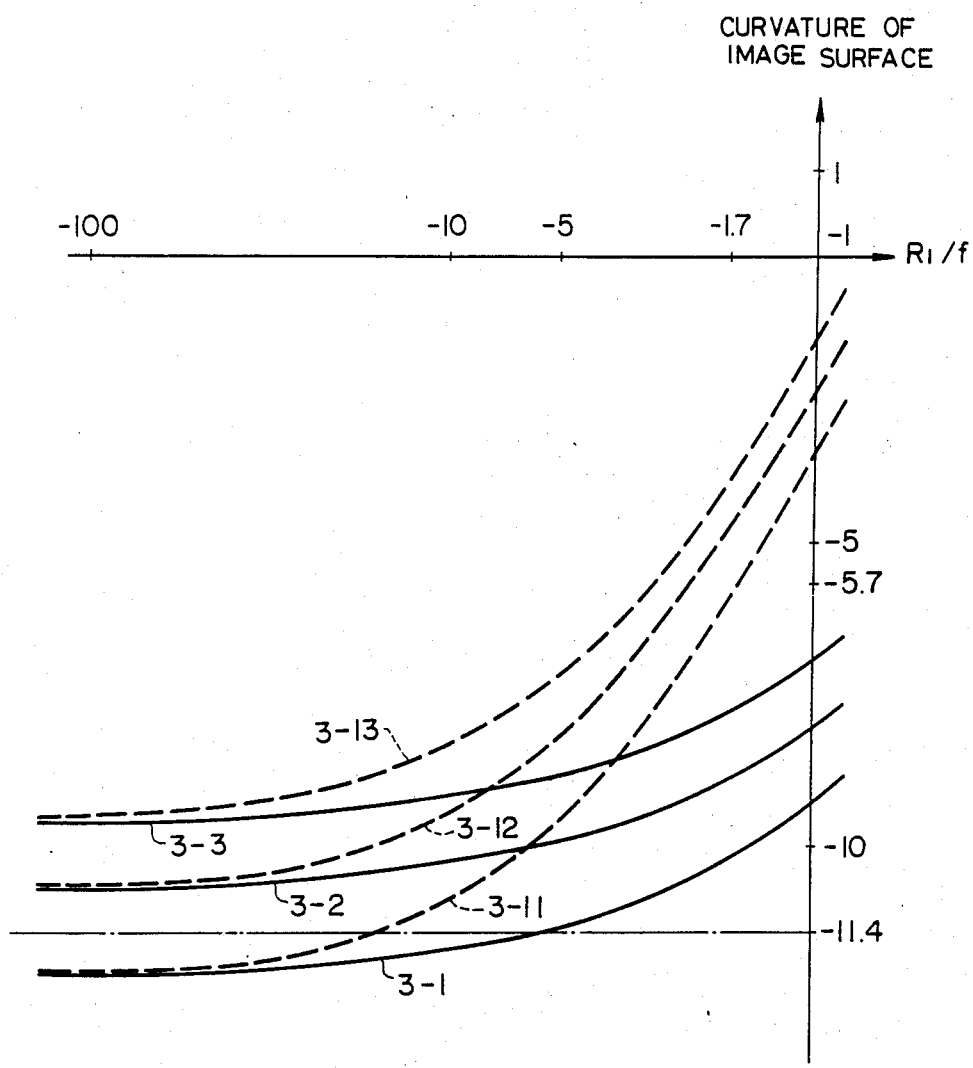
FIG. 3 graphically illustrates several other features of the invention.

FIG. 3 graphically illustrates the maximum curvature of the image surface at an maximum deflection angle of 21° as a function of $F_1/f$ as a variable, with b being chosen as a parameter. In FIG. 3, solid line curves represent the curvature in the sagittal plane while broken line curves represent the curvature in the meridional plane. The value of parameter n is equal to 1.6 for curves 3-1 and 3-11, to 1.8 for curves 3-2 and 3-12, and to 2.0 for curves 3-3 and 3.13. In order for the curvature in the sagittal plane to be not greater than 11.4 mm for $n=1.6$, it is necessary that $R_1/f \geq -5$. This determines the lower limit of the requirement (ii).

Six examples are indicated below. In each instance, $f=300$ mm, deflection angle is equal to ±21°, F/100, and T is a distance between the first lens surface and the entrance pupil.

EXAMPLE 1

| $R_1 = -510$ | $R_2 = -134.022$ | $n = 1.600$ |
|---|---|---|
| $T = -81.0$ | $d = 10.0$ | |

Figure 4:
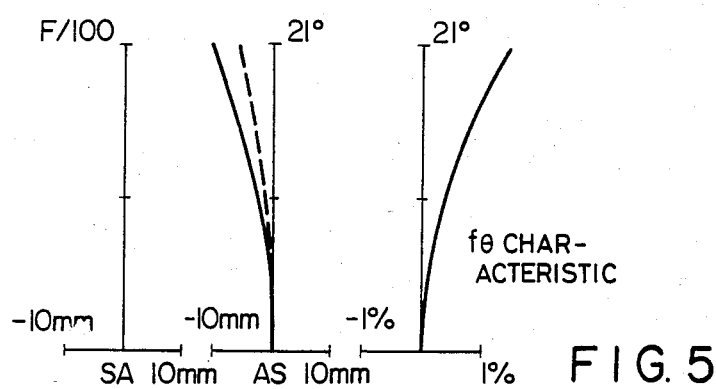
FIGS. 4 to 9 are graphically illustrations of aberrations of a first, a second, a third, a fourth, a fifth and a six embodiment of the invention, respectively.

Corresponding aberration is graphically shown in FIG. 4.

EXAMPLE 2

| $R_1 = -510$ | $R_2 = -164.622$ | $n = 1.800$ |
|---|---|---|
| $T = -94.0$ | $d = 10.0$ | |

Figure 5:
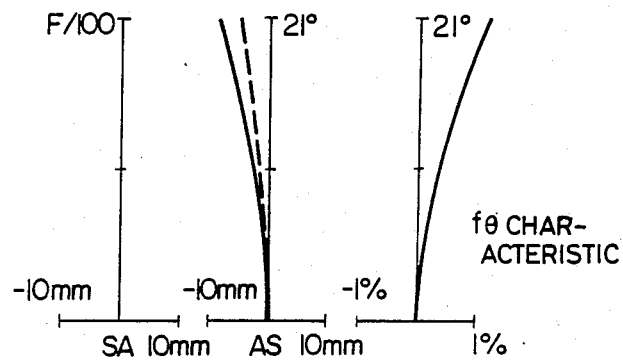

Corresponding aberration is graphically shown in FIG. 5.

EXAMPLE 3

| $R_1 = -1000$ | $R_2 = -153.114$ | $n = 1.600$ |
|---|---|---|
| $T = -91.0$ | $d = 10.0$ | |

Figure 6:
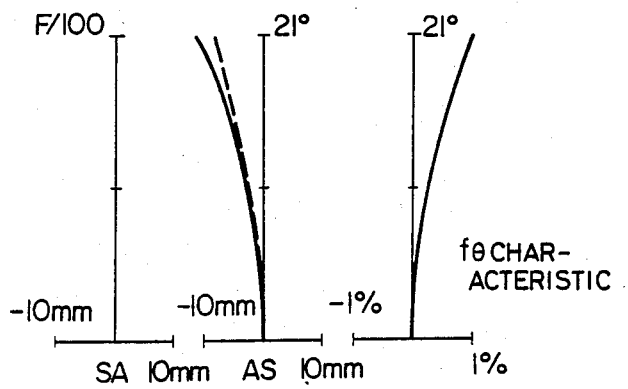

Corresponding aberration is graphically shown in FIG. 6.

EXAMPLE 4

| $R_1 = -1000$ | $R_2 = -194.409$ | $n = 1.800$ |
|---|---|---|
| $T = -106.0$ | $d = 10.0$ | |

Figure 7:
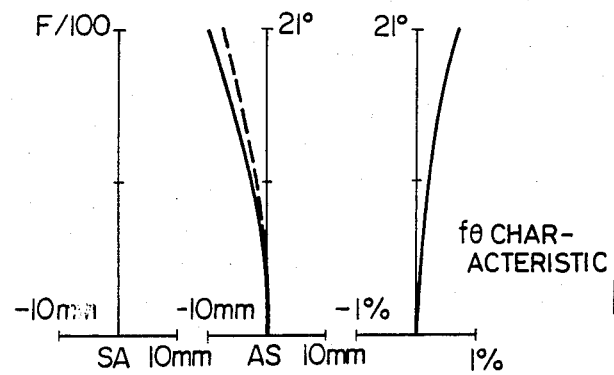

Corresponding aberration is graphically shown in FIG. 7.

EXAMPLE 5

| $R_1 = -1500$ | $R_2 = -161.116$ | $n = 1.600$ |
|---|---|---|
| $T = -94.0$ | $d = 10.0$ | |

Figure 8:
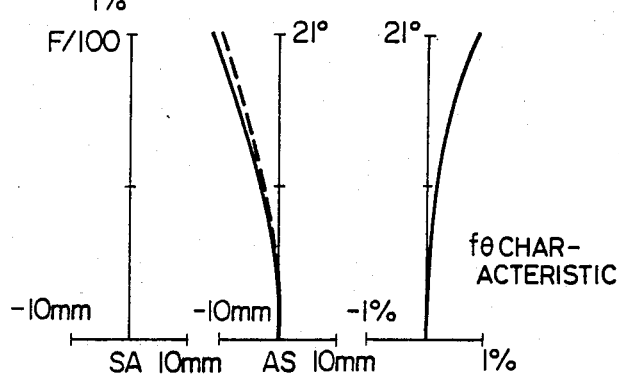

Corresponding aberration is graphically shown in FIG. 8.

EXAMPLE 6

| $R_1 = -1500$ | $R_2 = -207.510$ | n = 1.800 |
|---|---|---|
| T = -111.0 | d = 10.0 | |

Figure 9:
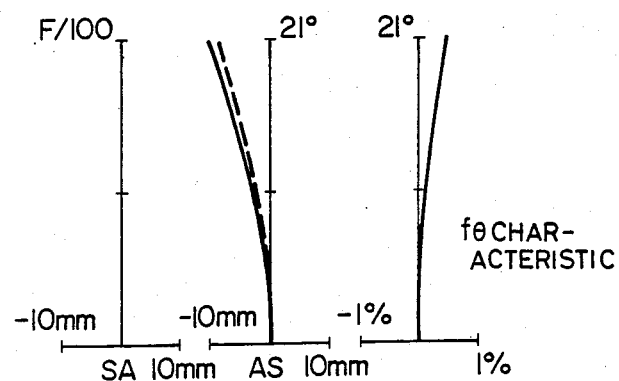

Corresponding aberration is graphically shown in FIG. 9.

It will be noted that in each example, the aberration is favorably corrected.

What is claimed is:

1. An fθ single lens having an optical axis used with a laser beam source providing a laser beam through an entrance pupil on an object side of the lens on said optical axis for focusing the laser beam, comprising a meniscus lens having a positive power with a concave first surface directed toward the object side and satisfying the following:
   (i) $1.6 \leq n \leq 2.0$
   (ii) $-5 \leq R1/f \leq -1.7$
   (iii) $-0.21 \leq T/nf \leq -0.16$ wherein R1 represents the radius of curvature of the first surface, f the focal length, n the refractive index, and T the distance between the first surface of the lens and the entrance pupil to said lens along the optical axis.

2. An fθ single lens according to claim 1 having values of f=300 mm, a deflection angle of ±21° and F/100 and wherein

| $R_1 = -510$ | $R_2 = -134.022$ | n = 1.600 |
|---|---|---|
| T = -81.0 | d = 10.0 | |

3. An fθ single lens according to claim 1 having values of f=300 mm, a deflection angle of ±21° and F/100 and wherein

| $R_1 = -510$ | $R_2 = -164.622$ | n = 1.800 |
|---|---|---|
| T = -94.0 | d = 10.0 | |

4. An fθ single lens according to claim 1 having values of f=300 mm, a deflection angle of ±21° and F/100 and wherein

| $R_1 = -1000$ | $R_2 = -153.114$ | n = 1.600 |
|---|---|---|
| T = -91.0 | d = 10.0 | |

5. An fθ single lens according to claim 1 having values of f=300 mm, a deflection angle of 21° and F/100 and wherein

| $R_1 = -1000$ | $R_2 = -194.409$ | n = 1.800 |
|---|---|---|
| T = -106.0 | d = 10.0 | |

6. An fθ single lens according to claim 1 having values of f=300 mm, a deflection angle of 21° and F/100 and wherein

| $R_1 = -1500$ | $R_2 = -161.116$ | n = 1.600 |
|---|---|---|
| T = -94.0 | d = 10.0 | |

7. An fθ single lens according to claim 1 having values of F=300 mm, a deflection angle of ±21° and F/100 and wherein

| $R_1 = -1500$ | $R_2 = -207.510$ | n = 1.800 |
|---|---|---|
| T = -111.0 | d = 10.0 | |

8. In the recording device of claim 1, said lens having values of f=300 mm, a deflection of ±21° and F/100 and wherein

| $R_1 = -510$ | $R_2 = -134.022$ | n = 1.600 |
|---|---|---|
| T = -81.0 | d = 10.0 | |

9. In the recording device of claim 1, said lens having values of f=300 mm, a deflection angle of ±21° and F/100 and wherein

| $R_1 = -510$ | $R_2 = -164.622$ | n = 1.800 |
|---|---|---|
| T = -94.0 | d = 10.0 | |

10. In the recording device of claim 1, said lens having values of f=300 mm, a deflection angle of ±21° and F/100 and wherein

| $R_1 = -1000$ | $R_2 = -153.114$ | n = 1.600 |
|---|---|---|
| T = -91.0 | d = 10.0 | |

11. In the recording device of claim 1, 1 having values of f=300 mm, a deflection angle of ±21° and F/100 and wherein

| $R_1 = -1000$ | $R_2 = -194.409$ | n = 1.800 |
|---|---|---|
| T = -106.0 | d = 10.0 | |

12. In the recording device of claim 1, said lens having values of f=300 mm, a deflection angle of ±21° and F/100 and wherein

| $R_1 = -1500$ | $R_2 = 161.116$ | n = 1.600 |
|---|---|---|
| T = -94.0 | d = 10.0 | |

13. In the recording device of claim 1, said lens having values of F=300 mm, a deflection angle of ±21° and F/100 and wherein

| $R_1 = -1500$ | $R_2 = -207.510$ | n = 1.800 |
|---|---|---|
| T = -111.0 | d = 10.0 | |

* * * * *